(12) United States Patent
Weiss et al.

(10) Patent No.: US 7,735,096 B2
(45) Date of Patent: Jun. 8, 2010

(54) DESTINATION APPLICATION PROGRAM INTERFACES

(75) Inventors: Rebecca C. Weiss, Menlo Park, CA (US); Dale A. Sather, Seattle, WA (US); Mei L. Wilson, Redmond, WA (US); Kirt A. Debique, Seattle, WA (US); Alexandre V. Grigorovitch, Redmond, WA (US); Robin C. B. Speed, Winchester (GB); Adil Sherwani, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1090 days.

(21) Appl. No.: 10/735,522

(22) Filed: Dec. 11, 2003

(65) Prior Publication Data

US 2005/0132168 A1   Jun. 16, 2005

(51) Int. Cl.
   *G06F 13/00* (2006.01)
(52) U.S. Cl. .................... 719/322; 725/105
(58) Field of Classification Search ............. 719/322, 719/328; 725/105
   See application file for complete search history.

(56) References Cited

U.S. PATENT DOCUMENTS

| 5,140,437 | A | | 8/1992 | Yonemitsu et al. |
| 5,420,801 | A | * | 5/1995 | Dockter et al. ............ 345/501 |
| 5,528,281 | A | | 6/1996 | Grady et al. |
| 5,539,886 | A | | 7/1996 | Aldred et al. |
| 5,546,584 | A | | 8/1996 | Lundin et al. |
| 5,574,934 | A | | 11/1996 | Mirashrafi et al. |
| 5,577,258 | A | * | 11/1996 | Cruz et al. ............ 709/219 |
| 5,604,843 | A | | 2/1997 | Shaw et al. |
| 5,625,404 | A | | 4/1997 | Grady et al. |
| 5,675,752 | A | | 10/1997 | Scott et al. |
| 5,712,906 | A | | 1/1998 | Grady et al. |
| 5,764,965 | A | | 6/1998 | Poimboeuf et al. |
| 5,765,011 | A | | 6/1998 | Wilkinson et al. |
| 5,786,814 | A | | 7/1998 | Moran et al. |
| 5,802,283 | A | | 9/1998 | Grady et al. |
| 5,815,689 | A | | 9/1998 | Shaw et al. |
| 5,878,431 | A | | 3/1999 | Potterveld et al. |
| 5,886,274 | A | | 3/1999 | Jungleib |

(Continued)

FOREIGN PATENT DOCUMENTS

EP            0784271            7/1997

(Continued)

OTHER PUBLICATIONS

Timothy K. Shih, "Participator Depenent Multimedia Presentation", Journal of Information Sciences, vol. 107, pp. 85-105, 1998.

(Continued)

*Primary Examiner*—Li B Zhen
(74) *Attorney, Agent, or Firm*—Lee & Hayes, PLLC

(57) ABSTRACT

Media processing methods, systems and application program interfaces (APIs) in which a destination component, also referred to as a destination, provides an application with a simple and unified way of rendering, archiving, broadcasting (or other types of media output processing) media from an origin to a target of choice, without requiring the application to have intimate knowledge about underlying components, their connectivity and management. For example, applications can use a destination to help manage the rendering or archiving (or other processing) of the particular media.

28 Claims, 6 Drawing Sheets

U.S. PATENT DOCUMENTS

| | | | |
|---|---|---|---|
| 5,887,139 | A | 3/1999 | Madison, Jr. et al. |
| 5,892,767 | A | 4/1999 | Bell et al. |
| 5,936,643 | A | 8/1999 | Tindell et al. |
| 5,987,628 | A | 11/1999 | Von Bokern et al. |
| 5,995,512 | A | 11/1999 | Pogue, Jr. |
| 5,996,015 | A | 11/1999 | Day et al. |
| 6,014,706 | A | 1/2000 | Cannon et al. |
| 6,038,625 | A | 3/2000 | Ogino et al. |
| 6,044,408 | A | 3/2000 | Engstrom et al. |
| 6,178,172 | B1 | 1/2001 | Rochberger |
| 6,185,612 | B1 | 2/2001 | Jensen et al. |
| 6,192,354 | B1 | 2/2001 | Bigus et al. |
| 6,209,041 | B1 | 3/2001 | Shaw et al. |
| 6,243,753 | B1 | 6/2001 | Machin et al. |
| 6,262,776 | B1 | 7/2001 | Griffits |
| 6,263,486 | B1 | 7/2001 | Boezeman et al. |
| 6,266,053 | B1 | 7/2001 | French et al. |
| 6,279,029 | B1 * | 8/2001 | Sampat et al. ............... 709/203 |
| 6,308,216 | B1 | 10/2001 | Goldszmidt et al. |
| 6,317,131 | B2 | 11/2001 | Basso et al. |
| 6,321,252 | B1 * | 11/2001 | Bhola et al. ................ 709/204 |
| 6,343,313 | B1 | 1/2002 | Salesky et al. |
| 6,347,079 | B1 | 2/2002 | Stephens et al. |
| 6,369,835 | B1 | 4/2002 | Lin |
| 6,385,201 | B1 | 5/2002 | Iwata |
| 6,389,467 | B1 | 5/2002 | Eyal |
| 6,430,526 | B1 | 8/2002 | Toll |
| 6,466,971 | B1 | 10/2002 | Humpleman et al. |
| 6,536,043 | B1 | 3/2003 | Guedalia |
| 6,539,163 | B1 | 3/2003 | Sheasby et al. |
| 6,546,426 | B1 | 4/2003 | Post |
| 6,549,932 | B1 | 4/2003 | McNally et al. |
| 6,581,102 | B1 * | 6/2003 | Amini et al. ................ 709/231 |
| 6,594,699 | B1 | 7/2003 | Sahai et al. |
| 6,594,773 | B1 | 7/2003 | Lisitsa et al. |
| 6,618,752 | B1 | 9/2003 | Moore et al. |
| 6,625,643 | B1 | 9/2003 | Colby et al. |
| 6,658,477 | B1 | 12/2003 | Lisitsa et al. |
| 6,684,331 | B1 | 1/2004 | Srivastava |
| 6,687,664 | B1 | 2/2004 | Sussman et al. |
| 6,691,312 | B1 | 2/2004 | Sen et al. |
| 6,694,368 | B1 * | 2/2004 | An et al. ..................... 709/227 |
| 6,711,171 | B1 | 3/2004 | Dobbins et al. |
| 6,725,274 | B1 | 4/2004 | Slik |
| 6,725,279 | B1 | 4/2004 | Richter et al. |
| 6,757,735 | B2 | 6/2004 | Apostolopulos et al. |
| 6,802,019 | B1 * | 10/2004 | Lauder ....................... 713/400 |
| 6,810,526 | B1 * | 10/2004 | Menard et al. ................ 725/46 |
| 6,823,225 | B1 * | 11/2004 | Sass ........................... 700/94 |
| 6,920,181 | B1 | 7/2005 | Porter |
| 6,957,430 | B2 | 10/2005 | Fant et al. |
| 6,975,752 | B2 | 12/2005 | Dixon et al. |
| 7,024,483 | B2 | 4/2006 | Dinker et al. |
| 7,035,858 | B2 | 4/2006 | Dinker et al. |
| 7,047,554 | B1 | 5/2006 | Lortz |
| 7,076,564 | B2 | 7/2006 | To et al. |
| 7,124,424 | B2 * | 10/2006 | Gordon et al. ................ 725/43 |
| 7,139,925 | B2 | 11/2006 | Dinker et al. |
| 7,197,535 | B2 | 3/2007 | Salesky et al. |
| 7,206,854 | B2 | 4/2007 | Kauffman et al. |
| 7,240,325 | B2 | 7/2007 | Keller |
| 7,246,318 | B2 | 7/2007 | Debique et al. |
| 7,290,057 | B2 | 10/2007 | Saunders et al. |
| 7,299,485 | B2 * | 11/2007 | Chaney et al. ................ 725/39 |
| 7,330,542 | B2 | 2/2008 | Kauhanen et al. |
| 7,415,537 | B1 | 8/2008 | Maes |
| 7,426,637 | B2 | 9/2008 | Risan et al. |
| 2001/0000962 | A1 * | 5/2001 | Rajan ......................... 345/302 |
| 2001/0024455 | A1 | 9/2001 | Thaler et al. |
| 2002/0051017 | A1 | 5/2002 | Wishoff |
| 2002/0085581 | A1 | 7/2002 | Hauck et al. |
| 2002/0099842 | A1 | 7/2002 | Jenning |
| 2002/0123997 | A1 | 9/2002 | Loy et al. |
| 2002/0158897 | A1 | 10/2002 | Besaw et al. |
| 2002/0174425 | A1 | 11/2002 | Markel et al. |
| 2002/0199031 | A1 | 12/2002 | Rust et al. |
| 2003/0028643 | A1 | 2/2003 | Jabri |
| 2003/0033424 | A1 | 2/2003 | Gould |
| 2003/0056029 | A1 * | 3/2003 | Huang et al. ................ 709/328 |
| 2003/0093568 | A1 | 5/2003 | Deshpande |
| 2003/0095504 | A1 | 5/2003 | Ogier |
| 2003/0101253 | A1 | 5/2003 | Saito et al. |
| 2003/0123659 | A1 | 7/2003 | Forstrom et al. |
| 2003/0146915 | A1 | 8/2003 | Brook et al. |
| 2003/0149772 | A1 | 8/2003 | Hsu et al. |
| 2003/0158957 | A1 | 8/2003 | Abdolsalehi |
| 2003/0177292 | A1 | 9/2003 | Smirnov et al. |
| 2003/0215214 | A1 | 11/2003 | Ma |
| 2003/0231867 | A1 | 12/2003 | Gates et al. |
| 2003/0236892 | A1 | 12/2003 | Coulombe |
| 2003/0236906 | A1 | 12/2003 | Klemets et al. |
| 2004/0001106 | A1 | 1/2004 | Deutscher et al. |
| 2004/0004631 | A1 | 1/2004 | Debique et al. |
| 2004/0031058 | A1 | 2/2004 | Reisman |
| 2004/0042413 | A1 | 3/2004 | Kawamura et al. |
| 2004/0073596 | A1 | 4/2004 | Kloninger et al. |
| 2004/0073912 | A1 * | 4/2004 | Meza .......................... 719/321 |
| 2004/0080504 | A1 | 4/2004 | Salesky et al. |
| 2004/0139157 | A1 * | 7/2004 | Neely et al. ................. 709/205 |
| 2004/0177162 | A1 | 9/2004 | Wetzel et al. |
| 2004/0207723 | A1 | 10/2004 | Davis et al. |
| 2004/0208132 | A1 | 10/2004 | Neulist et al. |
| 2004/0220926 | A1 | 11/2004 | Lamkin et al. |
| 2004/0230659 | A1 | 11/2004 | Chase |
| 2004/0236945 | A1 | 11/2004 | Risan et al. |
| 2004/0267778 | A1 | 12/2004 | Rudolph et al. |
| 2004/0267899 | A1 | 12/2004 | Rahman et al. |
| 2004/0267953 | A1 | 12/2004 | Dunbar et al. |
| 2004/0268224 | A1 | 12/2004 | Balkus et al. |
| 2004/0268357 | A1 | 12/2004 | Joy et al. |
| 2004/0268407 | A1 | 12/2004 | Sparrell et al. |
| 2005/0005025 | A1 | 1/2005 | Harville et al. |
| 2005/0018775 | A1 | 1/2005 | Subramanian et al. |
| 2005/0055517 | A1 | 3/2005 | Olds et al. |
| 2005/0066082 | A1 | 3/2005 | Forin et al. |
| 2005/0081158 | A1 | 4/2005 | Hwang |
| 2005/0125734 | A1 | 6/2005 | Mohammed et al. |
| 2005/0132168 | A1 | 6/2005 | Weiss et al. |
| 2005/0172309 | A1 | 8/2005 | Risan |
| 2005/0188311 | A1 | 8/2005 | Diesel et al. |
| 2005/0198189 | A1 | 9/2005 | Robinson et al. |
| 2005/0204289 | A1 | 9/2005 | Mohammed et al. |
| 2005/0226324 | A1 | 10/2005 | Ouyang et al. |
| 2005/0262254 | A1 | 11/2005 | Sherwani |
| 2007/0011321 | A1 | 1/2007 | Huntington et al. |
| 2008/0037957 | A1 | 2/2008 | Nallur et al. |
| 2008/0154407 | A1 | 6/2008 | Carson |

FOREIGN PATENT DOCUMENTS

| | | |
|---|---|---|
| EP | 0814403 | 12/1997 |
| JP | 2002514797 | 5/2002 |
| WO | WO9621189 | 7/1996 |
| WO | WO9957837 | 11/1999 |

OTHER PUBLICATIONS

Timothy K. Shih and Wen C. Pai, "A Stepwise Refinement Approach to Multimedia Presentation Designs", IEEE, pp. 117-122, 1997.

Arbab Ali Samejo et al., "Graphical User Interface Based Multimedia Web Suite in Windows Evironment", Mehran Unversity Research Journal of Engineering & Technology, vol. 20, No. 2, pp. 57-68, Apr. 2001.

Timothy Shih, et al., "A Knowledge Abstraction Approach for Multimedia Presentation", IEEE, pp. 528-532, 1997.

Sei-Hoon Lee and Chang-Jong Wang, "Open Multimedia/ Hypermedia Application Development Environment", Inspec, 1996.

Chi-Ming Chung, et al., "A Control and Data Abstraction Approach for Multimedia Presentation", Journal of the Chinese Institute of Electrical Engineering, vol. 5, No. 3, pp. 265-276, 1998.

Olson, et al., "Remote Rendering Using Vtk and Vic", Futures Laboratory, http://www-unix.mcs.anl.gov/fl/publications/vis00-vicvtk.pdf., 2 pages, Sep. 2000.

Engel, et al., "Remote 3D Visualization Using Image-Streaming Techniques", Computer Graphics Group, http://citeseer.nj.nec.com/394248.html, 4 pages, 1999.

Engel, et al., "Combining Local and Remote Visualiztion Techniques for Interactive Volume Rendering in Medical Applications", wwwvis.informatik.uni-stuttgart.de/eng/research/pub/pub2000/engel_vis00.pdf, 5 pp, Oct. 2000.

TGS website overview, http://www.tgs.com/pro_div/oiv_overview.htm, "Open Inventor from TGS4.0 Open Inventor Overview" printed Apr. 28, 2003, 4 pages, 2002.

Robertson et al., "Temporal Resolution Enhancement in Compressed Video Sequences", University of Notre Dame, Notre Dame, Indiana, pp. 1-11, Sep. 2001.

Girod et al., "Feedback-Based Error Control for Mobile Video Transmission", Proceedings of the IEEE, vol. 87, No. 10, pp. 1707-1723, Oct. 1999.

Chien et al., "Multiple Sprites and Frame Skipping Techniques for Sprite Generation with High Subjuctive Quality and Fast Speed", IEEE, pp. 785-788, Aug. 2002.

Agarwal, et al., "The Totem Multiple-Ring Ordering and Topology Maintenance Protocol", ACM, vol. 16 No. 2, 1998, pp. 93-132.

Bao, et al., "Topology Management in Ad Hoc Networks", ACM, 2003, pp. 129-140.

Jaffe, et al., "Automatic Update of Replicated Topology Data Bases", ACM, 1984, pp. 142-148.

Sullivan et al., "Programming with the Java Media Framework", Sean C. Sullivan, Loren Winzeler, Jeanine Deagen, and Deanna Brown, 1998, 99 pages.

Chatterjee, et al., "Microsoft DirectShow: A New Media Architecture", SMPTE Journal, Dec. 1997, pp. 865-871.

Cline, et al., "DirectShow RTP Support for Adaptivity in Networked Multimedia Applications", IEEE, 1998, pp. 13-22.

Dunn, et al., "The Design and Implementation of JaDiSM", pp. 1-38, Dec. 4, 2001.

"How Terminal Services Works", retrieved at <<http://technet2.microsoft.com/windowsserver/en/library/2cb5c8c9-cadc-44a9-bf39-856127f4c8271033.mspx>>, Microsoft TechNet, updated Mar. 28, 2003, pp. 1-15.

Maharaj, "A Primitive Window System Using GDI+ and C#", from Jun. 5, 2002 archives of <<http://web.archive.org/web/20020605051526/http://www.csharphelp.com/archives2/archive306.html>>, pp. 1-3.

Barth, et al., "Configuring Distributed Multimedia Applications Using Cinema", retrieved on Jan. 19, 2008 at <<http:// ieeexplore.ieee.org/xpls/absprintf.jsp?arnumber=557748>> Published 2006, pp. 10.

Blome, et al., "Core Media Technology in Windows XP Empowers You to Create Custom Audio/Video Processing Components", retrieved on Sep. 22, 2009 at //msdn.microsoft.com/en-us/magazine/cc301631.aspx>>, MSDN Magazine, 16 pages.

"DirectShow", retrieved on Sep. 22, 2009 at .gdcl.co.uk/dshow.htm>>, Archived Oct. 17, 2002, 12 pages.

"EvCode.h", retrieved on Sep. 22, 2009 at lelandnsmith.com/downloads/Microsoft/DirectX%209%20SDK/sdk/Include/evcode.h>> Microsoft, 2001, pp. 1-6.

"GstEvent", retrieved on Sep. 22, 2009 at gstreamer.net/docs/gstreamer/gstreamer-bstevent.html>>, GStreamer Core Reference Manual, Archived Apr. 29, 2003, pp. 1-14.

"IFileSourceFilter Interface", retrieved on Sep. 22, 2009 at msdn.microsoft.com/en-us/library/dd389981(VS.85,printer).aspx>>, MSDN, Microsoft, Jul. 13, 2009, 4 pages.

Taymans, et al., "GStreamer Application Development Manual", retrieved on Sep. 22, 2009 at .gstreamer.net/docs/gstreamer-manual.pdf>>, Archived Apr. 5, 2003, pp. i-iv and 1-84.

Thompson, "DirectShow for Media Playback in Windows", retrieved on Sep. 22, 2009 at <.flipcode.com/archives/DirectShow_For_Media_Playback_In_Windows-Part_I_Basics.shtml>>, Parts 1-3, Last Part Dated Sep. 13, 2000, 18 pages.

\* cited by examiner

DESTINATION APPLICATION PROGRAM INTERFACES

RELATED APPLICATIONS

This application is related to the following application, the disclosure of which are incorporated by reference:

U.S. patent application Ser. No. 10/730,735, entitled "Media Processing Methods, Systems and Application Program Interfaces", filed Dec. 8, 2003.

TECHNICAL FIELD

This invention relates to media processing methods, systems and application program interfaces.

BACKGROUND

As multimedia systems and architectures evolve, there is a continuing need for systems and architectures that are flexible in terms of implementation and the various environments in which such systems and architectures can be employed. As an example, consider the following as flexibility is viewed from the vantage point of software applications that execute in conjunction with such multimedia systems.

When it comes to rendering multimedia presentations, some software applications are very basic in terms of their functionality. That is, these basic types of applications might simply wish to provide a multimedia system with only a small amount of data that pertains to the presentation and have the multimedia system itself do the remainder of the work to render the presentation. Yet other more complex types of application may wish to be more intimately involved with the detailed processing that takes place within the multimedia system.

Against this backdrop, there is a continuing need to provide multimedia systems and architectures that meet the needs of applications that are distributed along a spectrum of simple applications to complex applications.

SUMMARY

Media processing methods, systems and application program interfaces (APIs) are described. In but one embodiment, a destination component, also referred to as a destination, provides an application a simple and unified way of describing where and how to do rendering, archiving, broadcasting (or other types of media output processing) of media from an origin to an output target of choice (also referred to herein as a media sink), without requiring the application to have intimate knowledge about underlying components, their connectivity and management. For example, applications can use a destination to help manage the rendering or archiving (or other processing) of the particular media, which advantageously allows the application to simply provide the media (or its location) and identify where the media is rendered, archived, multicasted, etc.

DETAILED DESCRIPTION

Overview

Figure 1:
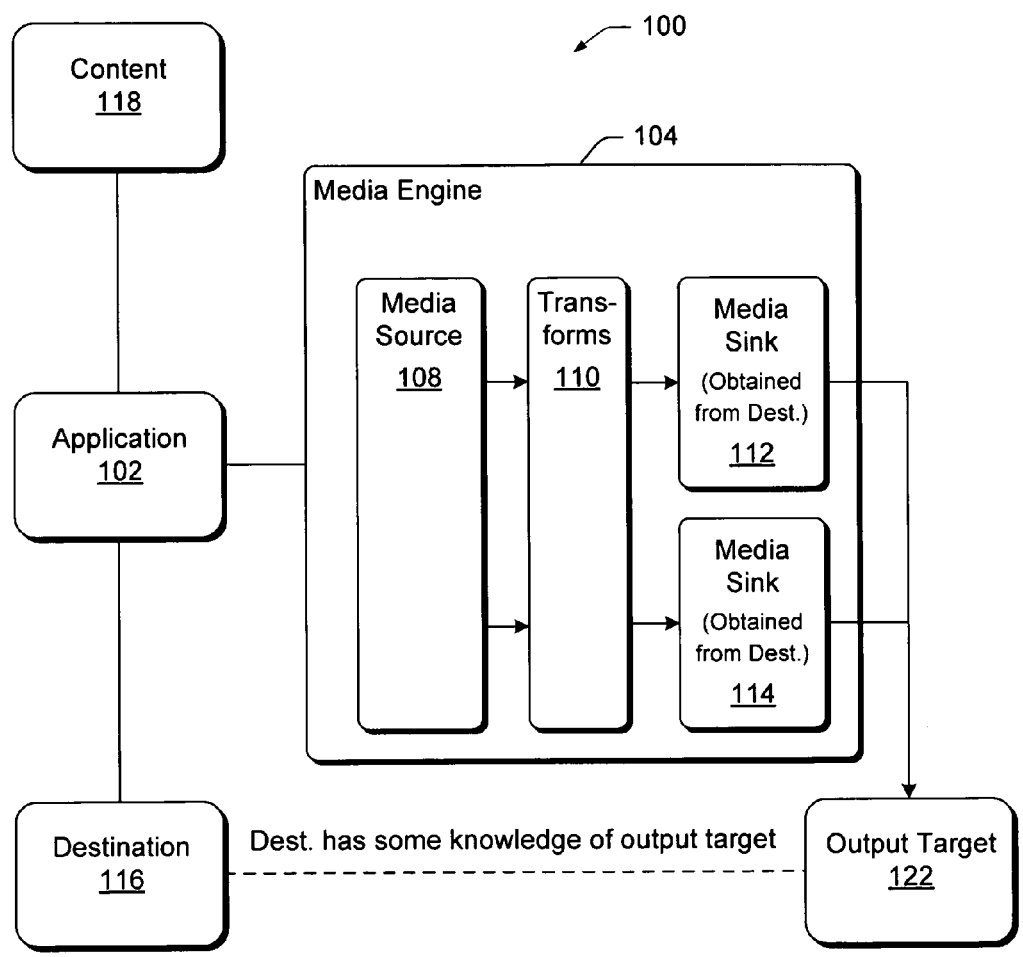
FIG. 1 is a block diagram of a system in accordance with one embodiment.

FIG. 1 illustrates a high level block diagram of an exemplary system in accordance with one embodiment, generally at 100. In system 100, an application 102 interacts with a media engine component (or more simply a media engine 104), a destination 116, content 118 (typically any suitable type of multimedia content, including for example stored or "live" video and/or audio streams) and one or more output targets 122 (e.g., a window, a file, a broadcast publishing point and the like).

In at least some embodiments, application 102 can use system 100 to participate in a presentation. A presentation, as used in this document, refers to or describes the handling of media content. Thus, a presentation can include visually and/or audibly presenting media content, such as a multimedia presentation in which both audio and accompanying video is presented to user via a window executing on a display device such as a display associated with a desk top device. A presentation can also refer to writing media content to a computer-readable medium such as a disk file. Further, a presentation can refer to broadcasting or multicasting media content over a network. Thus, a presentation is not simply limited to rendering multimedia content on a computing device.

In at least one embodiment, a destination is an object that defines output target(s) 122 where a presentation is to be presented (e.g. a window, disk file, URL and the like) and what the presentation does (e.g., render media, archive a media file, broadcast or multicast media over a network, and the like).

In at least one embodiment of system 100, application 102 creates destination 116 and media engine 104. After the application provides media engine 104 with destination 116 and some information describing from where the multimedia data for content 118 should be sourced, media engine 104 can include a media source 108, transforms 110 and one or more media sinks (e.g., media sinks 112 and 114 in this example), as described in the aforementioned co-pending U.S. patent application Ser. No. 10/730,735, entitled "Media Processing Methods, Systems and Application Program Interfaces". Destination 116 is responsible for providing media sinks 112 and 114 to the media engine.

In one embodiment, media source 108 comprises a component that can be used to read a particular type of media content from a particular source. For example, one type of media source might read compressed video data and another media source might read compressed audio data. The data can be received from a data store or from a device capturing "live" multimedia data (e.g., a camcorder). Alternately or additionally, a media source might be used to read a compressed data stream and separate the data stream into its compressed video and compressed audio component. Alternatively or additionally, a media source might be used to receive compressed data from over the network.

In this embodiment, transforms 110 comprise any suitable data handling components that are typically used in presentations. Such components can include those that uncompress compressed data, compress uncompressed data, and/or operate on data in some way, such as by imparting an effect to the data, as will be appreciated by the skilled artisan.

Media sinks 112 and 114 are typically associated with a particular type of media content and presentation. Thus, audio content might have an associated audio sink for playback such as an audio renderer. Likewise, video content might have an associated video sink for playback such as a video renderer. Additional media sinks can archive multimedia data to computer-readable media, e.g. a disk file, a CD, or the like. Additional media sinks can send data over the network.

In simple scenarios, a presentation may include only a single media sink (e.g., for a simple audio-only playback presentation the media sink may be an audio renderer). In the exemplary system of FIG. 1, media sinks 112 and 114 may be, for example, audio and video renderers, respectively, to play audio/video streams received from a camcorder device.

One reason for providing destination 116 is to abstract away the specific details of media sinks 112 and 114 from application 102. That is, in one embodiment, application 102 need only to provide information about multimedia content (in one embodiment, an URL indicating the location of the content) and information about destination 116 to media engine 104 (e.g., a pointer to the location where destination 116 can be accessed) to create an appropriate presentation at output target 122. After providing the content location information and the destination location information, destination 116 manages the operations needed for setting up the outputs of the presentation so that the application no longer needs to participate in the presentation.

Figure 6:
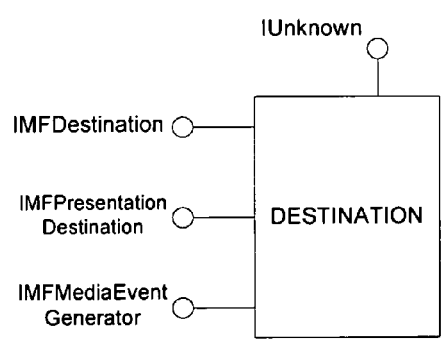
FIG. 6 is a diagram that illustrates interfaces of a destination in accordance with one embodiment.

In another aspect, implementations of destination 116 are based on an open and extensible architecture so that users can specify new destinations as existing applications evolve and/or new applications are written. FIG. 6 illustrates some of the APIs that can be implemented by destination 116. For example, the interface IMFDestination shown in FIG. 6 can include the following non-exclusive methods.

GetOutputInfo

The GetOutputInfo method is called by media engine 104 once for each input stream from the media source in the presentation. The input arguments include a pointer to a presentation description of the input stream and a pointer to a media type that will be used for the input stream. The output argument can be either an output info object (implementing the IMFOutputInfo interface) or a collection of output info objects. From an output info, the following objects can be obtained: an output, a property store, and a presentation clock. The "output" is either a media sink or it is an object implementing the IActivate interface, which is an object that is used by the media engine to create a media sink. A property store contains properties that may be helpful to the media engine in figuring out what to do with this output; it can include but is not limited to information such as: a stream sink ID, which is an identifier for the stream; an output ID, which is used to identify the output; and a directive, which indicates whether the media sink should be shut down when the media engine is finished using the media sink. A presentation clock if used is provided for each stream of the presentation. A user of application 102 can use a presentation clock to control a media sink independently of the other media sinks of the presentation. This method is described further below.

Lock/UnlockDestination

The Lock/UnlockDestination methods are used by the media engine to synchronize access to the destination while starting a new presentation. For example, a presentation may include multiple streams requiring multiple GetOutputInfo calls. The media engine can call the LockDestination method before starting this set of GetOutputInfo calls and call the UnlockDestination method after all GetOutputInfo calls for a presentation are complete. This method is described further below.

Example of Opening a Presentation Using a Destination

Figure 2:
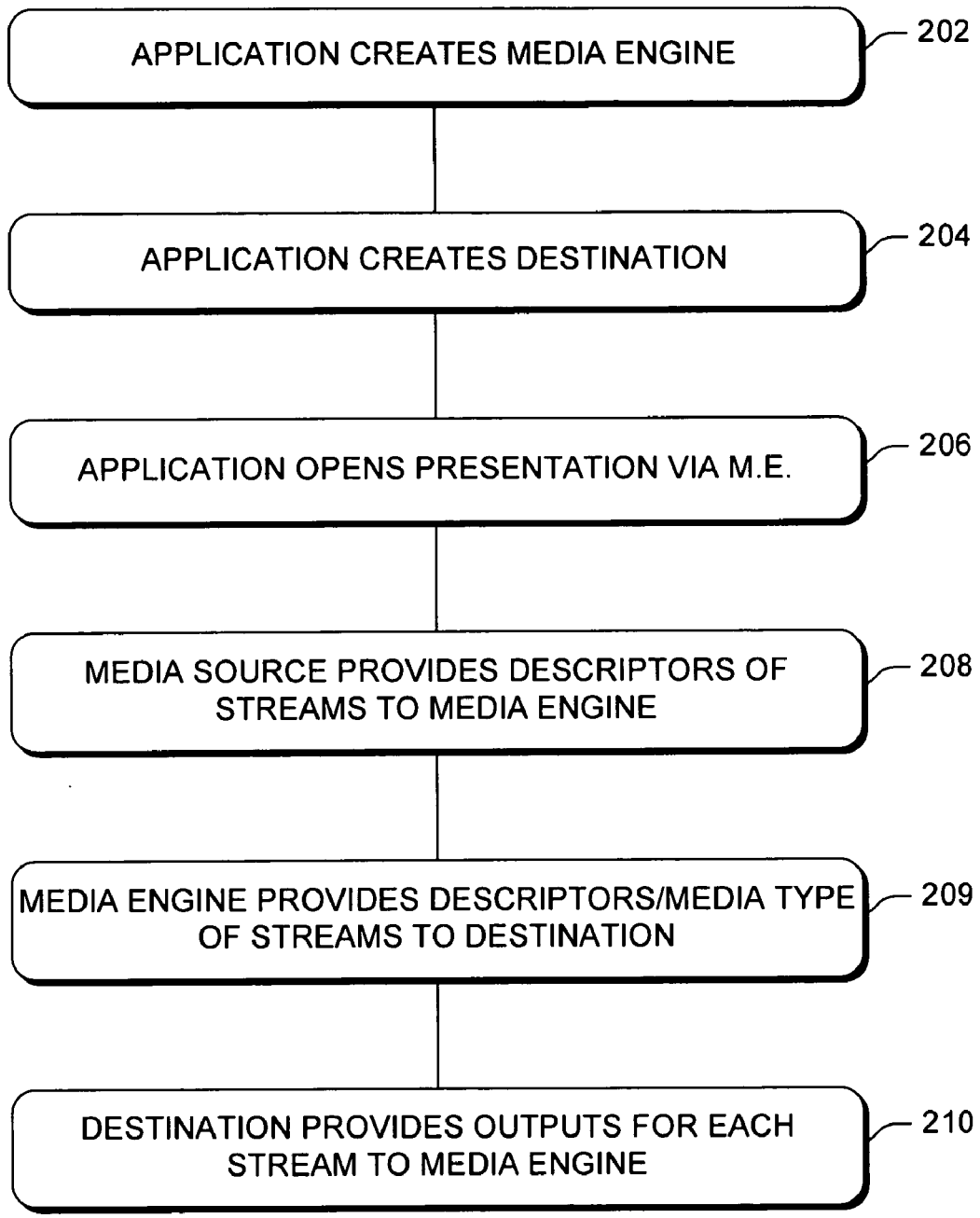
FIG. 2 is a flow diagram that describes steps in a method in accordance with one embodiment.

FIG. 2 illustrates an example operational flow of system 100 (FIG. 1) according to one embodiment. Referring to FIGS. 1 and 2, application 102 can open a presentation as follows. In a block 202, application creates media engine 104. In one embodiment, application 102 creates media engine 104 (described in the aforementioned co-pending U.S. patent application Ser. No. 10/730,735, entitled "Media Processing Methods, Systems and Application Program Interfaces"). In one embodiment, the operating system includes a standard media engine that can be used to implement media engine 104.

In a block 204, application 102 creates destination 116. In one embodiment, the operating system includes standard destination objects for common scenarios (e.g., playing back audio and/or video content in a window or archiving media in a file to a certain multimedia format, etc.). In other embodiments, application 102 includes "custom" destination objects that conform to a publicly available destination specification.

In a block 206, application 102 causes media engine 104 to open a presentation. In one embodiment, application 102 makes an "Open" call (examples of which are described below) to an API of media engine 104, providing location information for the media content and the destination created in block 204. For example, the "Open" call can be to an "OpenURL" method to open a URL for playback scenarios, or an "OpenSource" method to open an already-existing media source. In some embodiments, such "Open" methods have at least two arguments, namely, pointers to the content and the destination. Other "Open" methods can also include a pointer to descriptor information (e.g., a topology indicating compression and bit-rate information for encoding scenarios) as an argument. Embodiments of various "Open" methods are described below in more detail. In performing the "Open" method, media engine 104 makes a GetOutputInfo call to an API of destination 116 for each stream of the presentation.

In block 208, in one embodiment, media source 108 provides to media engine 104 description information regarding each media stream of the presentation. In block 209, in one embodiment, the media engine passes descriptor and media type information of each stream generated in block 208 to destination 116. In block 210, in one embodiment, destination 116 provides an output that will result in the stream being presented in output target 122 for each stream. This information allows media engine 104 to set up transforms 110 and obtain media sinks (e.g., media sinks 112 and 114) used in performing the presentation. In one embodiment, destination 116 performs the aforementioned GetOutputInfo method to provide the information in block 210. In this embodiment, in performing the GetOutputInfo method, destination 116 outputs: (1) a property store; and (2) an output info object (also referred to herein simply as an output info) or a collection of output infos.

Output Info

Because the GetOutputInfo method is called for each stream in the presentation, each stream has one or more associated output infos unless the destination does not have an output for the stream. In one embodiment, the output info object encapsulates three pieces of data: an "output" object, a property store, and a presentation clock. In this embodiment, only the output info object (or more simply "output info") is mandatory. These data from the output info are described below.

Output

In one embodiment, media engine 104 uses each output info to obtain an output object. What this object is can be determined at run-time; it may itself be a media sink, or it may be an IActivate from which a media sink can be obtained. The media engine obtains and configures the corresponding media sink (e.g., audio and/or video renderers) for the associated stream as described in the aforementioned co-pending U.S. patent application Ser. No. 10/730,735, entitled "Media Processing Methods, Systems and Application Program Interfaces").

Property Store

In some embodiments, the output info object provided by the destination 116 for a stream may include a property store. Properties in that property store may include but are not limited to: identifier information indicating which stream sink to use from the media sink, and an identifier for the output info that will assist the media engine in handling destination changes, and/or a directive indicating whether to shut down the media sink associated with the output info (i.e., media engine 104 obtains media sinks from output infos, as described in the aforementioned co-pending U.S. patent application Ser. No. 10/730,735, entitled "Media Processing Methods, Systems and Application Program Interfaces"). In some scenarios, the property store can contain nothing.

Presentation Clock

In some embodiments, the output info object provided by the destination 116 for a stream may include a presentation clock. A presentation clock allows application 102 to independently control (e.g., start, stop, pause, etc.) the media sink obtained from the associated output. For example, in an encoding scenario, the application may be previewing a video stream while the stream is being archived. The application's user may then be able to stop archiving the stream (via the presentation clock) when the user detects an unwanted portion of the stream (e.g., commercials). The application's user can then restart archiving of the stream when the unwanted portion ends.

Custom and Standard Destinations

Figure 3:
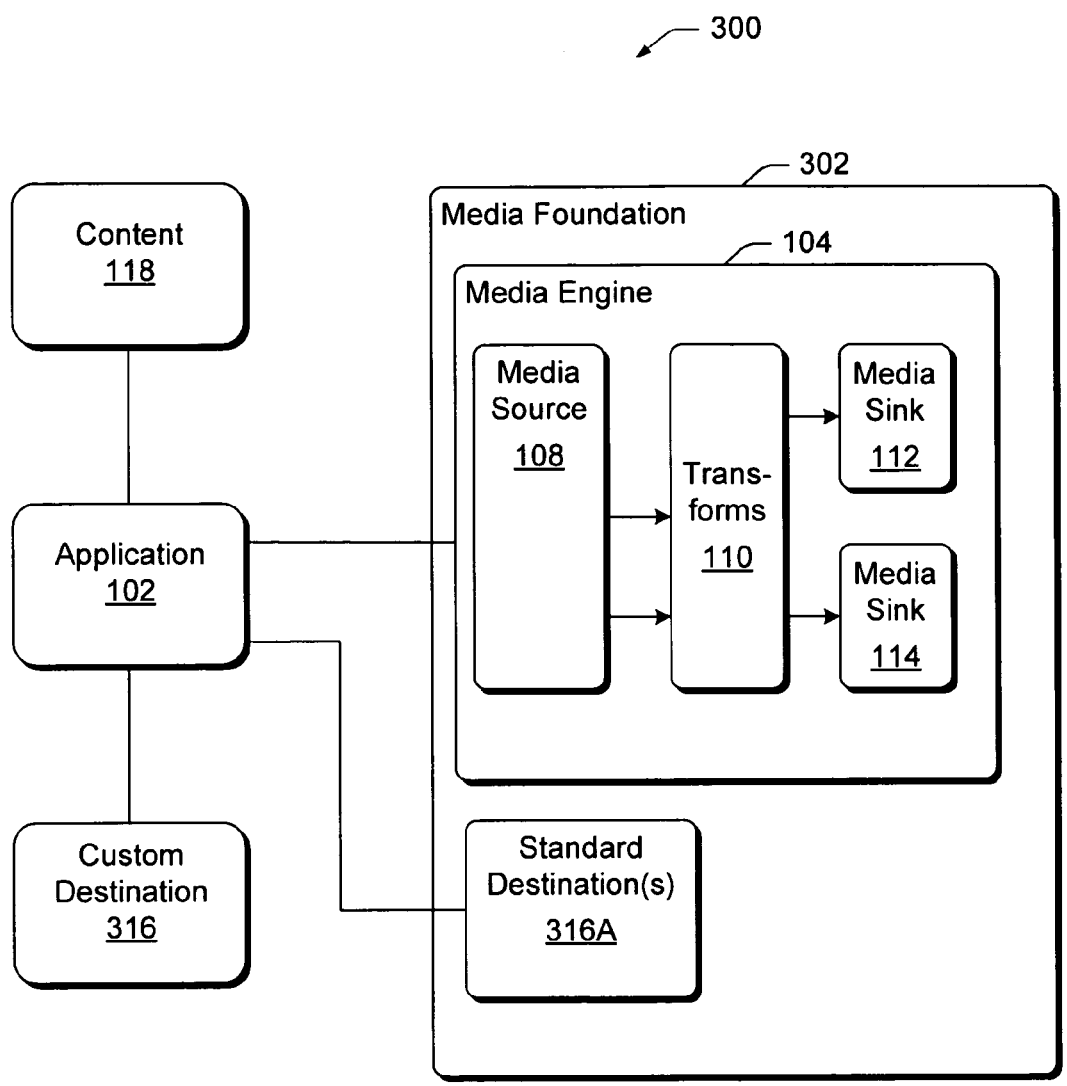
FIG. 3 is a block diagram of a system in accordance with another embodiment.

FIG. 3 illustrates an example system 300 that uses destinations, according to another embodiment. System 300 is substantially similar to system 100 (FIG. 1) except that system 300 includes one of either custom destination 316 or standard destination(s) 316A instead of destination 116 (FIG. 1) built for a software environment 302 referred to herein as Media Foundation. In this embodiment, application 102 is built on top of Media Foundation and is able to create: (1) media engine 104 (e.g., a standard media engine that is part of Media Foundation); and (2) a destination (e.g., a custom destination 316 written for application 102 conforming to a media engine specification or a standard destination 316A that is part of Media Foundation). If the application is using one of the Destinations provided by Media Foundation, a destination as can be created by using the following non-exclusive Media Foundation methods:

MFCreatePlaybackDestination

The method MFCreatePlaybackDestination is called by an application to create a standard playback destination. In one embodiment, this method has, as one input argument, a handle to a window in which playback of video content is to take place. Optionally, the method can include a pointer to a presentation clock (described above). In one embodiment, for audio-only destinations, the handle can be omitted (i.e., set to zero or null). The destination will then provide the media engine with output infos from which the appropriate media sinks can be created; in this case, these are a video renderer to render into the specified window, and an audio renderer that will render audio into the system's default speakers. This method is described further in an API section below.

MFCreateXXXArchiveDestination

The MFCreateXXXArchiveDestination methods (where XXX represents a code for one of the various types of media formats (e.g., ASF, WAV and others) supported by Media Foundation. For example, MFCreateASFArchiveDestination can be called by an application to create a standard ASF encoding destination. In one embodiment, this method has, as one input argument, a pointer to a file in which the media stream is to be archived. This method has a presentation descriptor for another input argument, which includes information such as the compression, bit-rate, etc. Optionally, the method can include a pointer to a presentation clock (described above). This method is described further in an API section below.

MFCreateMediaSinkDestination

The method MFCreatePlaybackDestination is called by an application that has created its own media sink.

Destination Collections

Figure 7:
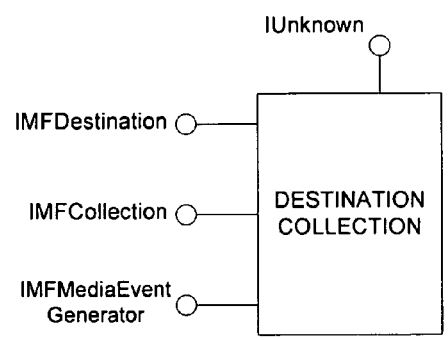
FIG. 7 is a diagram that illustrates interfaces of a destination collection in accordance with one embodiment.

In some scenarios, the application may wish to use a combination of destinations. For example, in a typical encoding scenario, the application may wish to display the content while it is being encoded. Thus, two destinations are needed. In one embodiment, the application can create a destination collection object that includes two "sub-destinations"—one for the encoding destination and another for the preview destination. In one embodiment, the destination collection object (or more simply a destination collection) also is able to send a MEDestinationChanged event, which can be sent to the media engine to indicate if the set of outputs for the destination changes. Note, the MEDestinationChanged event is not limited to destination collections. In one embodiment based on Media Foundation, a destination collection object as shown in FIG. 7 can be created by using the following non-exclusive Media Foundation method:

MFCreateDestinationCollection

The method MFCreateDestinationCollection can be used by an application to create a group collection. This method has a pointer to the destination collection location as one input argument. In one embodiment, the destination collection includes the IMFDestination API (described above) and an IMFMediaEventGenerator API (described below in conjunction with changing destinations). This embodiment of a destination collection also includes an IMFCollection API, which is described in more detail in the API section below. The IMFCollection API can be used by the application to add or remove "sub-destinations from the destination collection.

The application can open the content by passing the destination collection to the media engine in the "Open" call (see block 206 in FIG. 2). When the media engine makes an IMFDestination::GetOutputInfo call to the destination collection, the destination collection in turn makes GetOutputInfo calls to each sub-destination. Each sub-destination returns an output info or a collection of output infos to the destination collection. The destination collection is configured to group all these output infos into a collection and return this collection to the media engine in response to the GetOutputInfo call received by the destination collection.

Presentation Destinations

In some scenarios, the application may need to configure the destination based on the nature of the input media content. For example, application 102 (FIG. 3) may need to get some information (e.g., stream identifier information) before it can configure the destination. For example, in a playback scenario in which the media content has multiple streams, application 102 may wish to assign each stream to a particular window; however, application 102 will not know which stream should be associated with which output presentation stream until it can see the presentation descriptor. The presentation descriptor gives the application the opportunity to see what streams are in the presentation before making a decision on how each stream should be outputted. The application then needs to communicate these decisions to the destination so that the destination can act on them.

In one embodiment, a presentation destination object (which is a subcategory of destinations) is used to address this need. In one embodiment, a presentation destination object (or more simply a presentation destination) implements an API referred to as IMFPresentationDestination in FIG. 6. In this example embodiment, the interface IMFPresentationDestination can include the following non-exclusive methods.

GetOutputPresentation

The GetOutputPresentation is called by the application, and optionally includes a presentation description as an input argument. This method returns a pointer to an output presentation descriptor of the output presentation stream corresponding to the input presentation description. In scenarios in which the presentation destination is a destination collection (described below in conjunction with FIG. 7) having multiple destinations, the output presentation descriptor will contain identifying information for all of the output presentation streams corresponding to the multiple destinations. In some embodiments, if the application does not include an input presentation descriptor argument, then the method simply returns a descriptor that describes a best guess regarding the output presentation that would occur by default.

SetOutputPresentation

The SetOutputPresentation is called by the application, and includes as input arguments both a presentation description and an output presentation descriptor to be matched to the stream(s) of input presentation description. In some embodiments, if the application does not specify an input presentation descriptor, then the specified output presentation descriptor is set to be the default output presentation descriptor. If the application does not specify an output presentation descriptor, then the specified input presentation description should be matched to the default output presentation descriptor; such a call could be made to give the presentation destination advance notice of an upcoming presentation so that it can map out how it will match those input streams to output streams in advance.

The stream descriptors for the output presentation descriptor may contain metadata set by the application that indicate which input stream the application would like to be matched to this output stream.

Example of Configuring a Presentation Destination

An example operational flow in configuring a presentation destination is described below in conjunction with FIGS. 1 and 4. In this embodiment, the flow diagram of FIG. 4 occurs between blocks 209 and 210 (FIG. 2).

In one embodiment, media source provides a new presentation descriptor to the media engine to indicate that it is to begin a new presentation. In a block 402, media engine 104 can obtain a descriptor of the new presentation from the media source. Media engine 104 does so when it is to begin a new presentation. For example, in one embodiment, this occurs in response to media engine 104 receiving an "Open" call from the application as shown in block 401.

In a block 404, in response to obtaining a new presentation, media engine 104 issues an event that it is starting a new presentation. In one embodiment, the event is defined as MENewPresentation, which contains the input presentation description.

In a block 406, if application 102 has signed up as a delegate (as determined in block 405) of the MENewPresentation event (typically but not exclusively when the application is using a presentation destination and wishes to configure it in response to MENewPresentation), the application performs operations to get the information needed to configure presentation destination 116 and match its streams to outputs. For example, application 102 can pass the presentation description to presentation destination 116 via a GetOutputPresentation call to obtain the output presentation descriptor(s) that destination 116 plans to associate with the stream(s) in that presentation. In this embodiment, the returned output presentation descriptor(s) include identifying information for the stream(s).

The application can then use this identifying information to configure the destination. Continuing the above example scenario of rendering multiple media streams each in a different specified window, the application can use the information obtained in block 406 to associate each of the output presentation streams to the appropriate input stream. These associations are set as properties associated with each stream on the output presentation. The application can then call SetOutputPresentation, specifying the input presentation description from the MENewPresentation event and the output presentation descriptor for each stream that contains the application-supplied matching information.

In a block 408, application 102 signals media engine 104 that it has completed handling of the MENewPresentation event.

Figure 4:
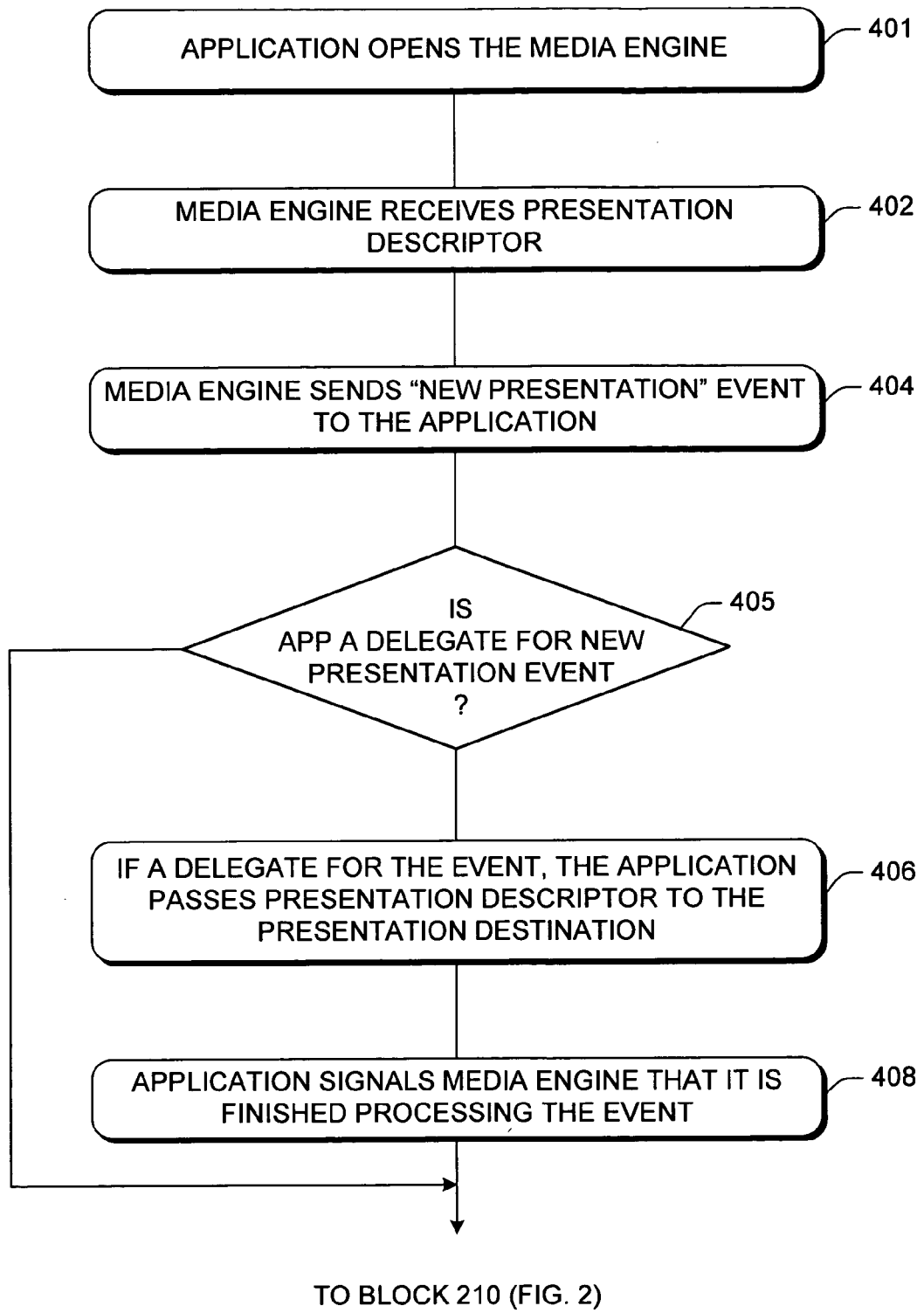
FIG. 4 is a flow diagram that describes steps in a method in accordance with another embodiment.

After this point, the media engine proceeds with block 210 (FIG. 2) as shown in FIG. 4, with the presentation destination observing the matchings requested by the application. If application 102 is not a delegate for the event (as determined in block 405), then following block 404, the operational flow proceeds to block 210 as shown in FIG. 4.

In another embodiment, the media engine can make use of the presentation destinations without the application's involvement. It does so by calling SetOutputPresentation with the next upcoming input presentation, with a NULL output presentation. This gives the destination an advance look at the new presentation so that it can make decisions in advance about how to match each input streams for the eventual GetOutputInfo calls. This can all be done without the application's involvement.

Changing the Destination During a Presentation

In some scenarios, the destination may need to be changed during a presentation. For example, the application may decide to change the destination, or the destination may need to be changed based on the nature of the input media content (e.g., a timeline presentation in which multiple presentation streams occur in a sequence). In one embodiment, the destination includes a MEDestinationChanged event that signals the media engine that the destination is being changed during the current presentation. For example, the destination can be configured to automatically send a MEDestinationChanged event to the media whenever the destination changes.

In some embodiments, the destination also implements an API referred to as IMFMediaEventGenerator as shown in FIG. 6 to allow the application to initiate the MEDestinationChanged event. In one embodiment, the application can call an IMFMediaEventGenerator::QueueEvent method to queue the MEDestinationChanged event on the destination.

Example Operation Flow in Changing a Presentation Destination

Figure 5:
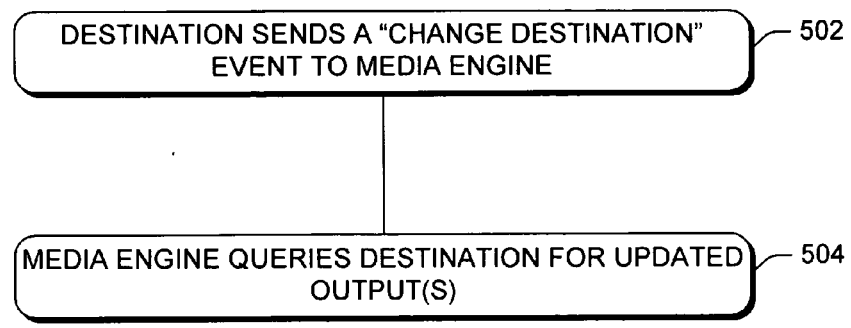
FIG. 5 is a flow diagram that describes steps in a method of changing a destination, in accordance with another embodiment.

An example operational flow in changing a presentation destination is described below in conjunction with FIGS. 1 and 5. In this embodiment, the flow diagram of FIG. 5 can occur anytime during the performance of the presentation.

In a block 502, destination 116 sends a MEDestinationChanged event to media engine 104 when the destination is changed. As previously stated, in some embodiments the destination can be configured to automatically send the MEDestinationChanged event when application 102 changes the destination. In other embodiments, after application 102 changes destination 116, the destination is configured to send the MEDestinationChanged event after the application makes a call to the aforementioned IMFMediaEventGenerator:: QueueEvent method of the IMFMediaEventGenerator API. In other embodiments, the destination can send this event itself if something in its internal state has changed such that it needs to update the set of outputs.

In a block 504, media engine 104 then queries destination 116 for updated output presentation descriptors. In one embodiment, media engine 104 makes a call to the GetOutputInfo method of the IMFDestination API for each stream to get the updated output infos, from which media sinks can be obtained, exactly as is done at the beginning of a presentation. The media engine will then resolve the inputs and outputs, making whatever changes are needed to the topology.

Timeline Presentations

In some scenarios, the presentation originating from the media source may change during the session. In one embodiment, this occurs due to a "timeline" media source that is providing a series of presentations, one after the other. Just as in the single-presentation case, the media engine will request outputs from the destination in advance of when the new presentation is to start playing. The destination may hand back the same outputs as for the last presentation, or it may change one or more of the outputs (or introduce new outputs or remove old outputs) from the last presentation. Furthermore, if the destination is a presentation destination, the application can participate in this process, notifying the destination of the upcoming presentation and perhaps changing how the destination is configured in response, as described above in the section on Presentation Destinations.

Distributed (Remote) Presentations

In accordance with one embodiment, application 102 and media engine 104 (FIG. 3) are also capable of presenting audio and video to devices existing on remote machines in addition to device that exist on local machines. One example where this is useful is when an application is using the above described systems while running under a remote desktop application. One particular remote desktop application, and one which serves as the basis of the example described below, is Terminal Services (TS). It is to be appreciated and understood that the concepts described just below can be employed in connection with different remote applications without departing from the spirit and scope of the claimed subject matter.

In the Terminal Services (TS) case, the user is typically physically sitting at the console of a TS client, while running the application from a TS server machine. Any media that is to be played, in this example, is sourced from the TS server, but needs to be sent over a network to the TS client for rendering.

In accordance with the described embodiment, the media engine is configured to send compressed data over the network, in distributed scenarios, and the work of decompression and rendering is conducted entirely on the machine where rendering is to take place—i.e. at the TS client. This allows high-quality content to be played remotely over any particular network connection. It also ensures that the media content presented to the user goes through the same components (i.e. decoders and renderers), as it does in the regular local playback scenario.

In an example scenario in which remote playback can be performed, application 102 (FIG. 3) on the TS server creates a destination in much the same way it does in the local scenario. In this example, application 102 then makes the desired "Open" call on media engine 104 providing pointers to the content (which resides locally with the application on the TS server) and to the destination (which also resides on the TS server). The media engine then makes a GetOutputInfo call on the destination. The destination 452 then queries Terminal Services and finds out that the presentation is to take place in connection with a distributed scenario. Information is returned in the output infos that indicates that the media sinks are located on a remote machine (i.e., the TS client).

MF also creates a media engine on the TS client machine and gives it the output infos, which were obtained by media engine 104 (as described in block 208 of FIG. 2) on the TS server. The TS client media engine then obtains media sinks from the output infos and uses them in performing the presentation on the TS client.

Regardless of whether the presentation is to be rendered locally or remotely, the destination registers with Terminal Services to receive notifications when the session changes from local to remote or vice versa. When such a change occurs, the destination receives a notification from Terminal Services, and then sends the MEDestinationChanged event to the media engine, as described in another section of this document. The media engine then makes calls to the GetOutputInfo method of the IMFDestination API to get the updated information regarding where the media sinks are located, and re-configures its media pipeline to render the media to the correct location.

It is to be appreciated and understood that the application does not have to do anything differently between the distributed and local scenarios. The same can be said of the media source.

Application Program Interfaces

The following section provides documentation of APIs associated with an exemplary implementation of the above-described systems. It is to be appreciated and understood that APIs other than the ones specifically described below can be utilized to implement the above-described systems and functionality without departing from the spirit and scope of the claimed subject matter. This section also contains documentation of events and properties of destination objects.

As shown in FIG. 6, one embodiment of a destination includes the: IMFDestination, IMFPresentationDestination and IMFMediaEventGenerator APIs, which are specified in more detail below, according to one embodiment.

MFDestination

The IMFDestination interface is used by the Media Engine to get to the Media Sinks to which the data from the various source streams should be sent.

In addition to the methods inherited from IUnknown, the IMFDestination interface exposes the methods LockDestination, UnlockDestination, and GetOutputInfo.

IMFDestination::LockDestination

A call to LockDestination indicates that the caller is about to do a round of GetOutputInfo calls for a presentation. The caller should call LockDestination once before the round of GetOutputInfo calls and should call UnlockDestination once afterwards.

While locked, the Destination should not change anything about the outputs that it plans to hand back to the caller in GetOutputInfo.

Syntax

```
HRESULT LockDestination(
);
```

Parameters

Return Values

If the method succeeds, it returns S_OK. If it fails, it returns an error code.

Remarks

If another thread calls LockDestination while the Destination is locked, the Destination should block that call until the first thread has unlocked it. If a thread has the Destination locked and calls LockDestination again, the call should allow the lock to recurse.

IMFDestination::UnlockDestination

A call to UnlockDestination indicates that the caller has just finished a round of GetOutputInfo calls for a presentation. The caller should call LockDestination once before the round of GetOutputInfo calls and should call UnlockDestination once afterwards.

Syntax

```
HRESULT UnlockDestination(
);
```

Parameters

Return Values

If the method succeeds, it returns S_OK. If it fails, it returns an error code.

Remarks

If another thread calls LockDestination while the Destination is locked, the Destination should block that call until the first thread has unlocked it. If a thread has the Destination locked and calls LockDestination again, the call should allow the lock to recurse.

IMFDestination::GetOutputInfo

The GetOutputInfo method allows the caller (generally, the Media Engine) to obtain a set of IMFOutputInfos from which to create one or more Media Sinks for the given Stream Descriptor (from the Media Source). GetOutputInfo is generally called while the Media Engine is processing the IMFMediaEngine::OpenURL or OpenSource calls.

Syntax

```
HRESULT GetOutputInfo(
    IMFStreamDescriptor*    pStreamDescriptor,
    IMFMediaType*           pMediaType,
    IUnknown**              ppunkOutputInfo     );
);
```

Parameters pStreamDescriptor

[in] Pointer to a Stream Descriptor describing the source stream. In general, this is obtained directly from the Presentation Descriptor exposed by the Media Source. Should not be NULL.

pMediaType

[in] Pointer to a Media Type from the list of Media Types enumerated by pStreamDescriptor. This indicates the Media Type that will be used by the Media Source. Should not be NULL.

ppunkOutputInfo

[out] Pointer to a variable that will be set either to a pointer to an IMFOutputInfo or a pointer to a Collection of Output Infos. The value of *ppunkOutputInfo may be set to NULL if there are no outputs for pStreamDescriptor. Should not be NULL.

Return Values

If the method succeeds, it returns S_OK. If it fails, it returns an error code. The error code MF_E_NO_MATCHING_OUTPUTS means that this Destination has no outputs corresponding to pStreamDescriptor, and in this case *ppunkOutputInfo will be NULL.

Remarks

Note that the Destination returns IMFOutputInfos and not IMFMediaSinks. IMFOutputInfo may allow direct access to a Media Sink, or it may point to an IActivate that will have to be activated in order to obtain the Media Sink. There is no requirement that the Destination know anything about the Media Sink that eventually gets created. This method can be used to enable remote scenarios.

Apps should NOT attempt to manipulate a Media Sink during the presentation by calling GetOutputInfo to get it from the Destination. This can cause undefined behavior. Instead, the app should use the appropriate service from the Media Engine. In general, the Media Engine will be the only one ever calling GetOutputInfo.

If the Output Info that is returned holds a Property Store, it may contain properties that will be useful in using or configuring the Media Sink that will get used.

The Media Engine can call GetOutputInfo at any point during the lifetime of the Destination object, and it can be called more than once for a given pStreamDescriptor. The Destination is not required to return the same output both times. The IMFPresentationDestination methods provide a stronger set of guarantees than this; please see that documentation for details.

A single Destination must not be shared between two Media Engines that are running concurrently. Some Destinations, however, can be reused after IMFMediaEngine::Close has been called. Destinations for whom it makes sense to reuse the outputs, such as playback Destinations, should be implemented to support reuse; Destinations whose outputs are inherently not reusable, such as archive Destinations, may fail GetOutputInfo calls upon reuse, or the Media Sinks returned in the outputs may simply be unusable.

The Media Engine generally calls one round of GetOutputInfo calls for each presentation that it gets from the Media Source (that is, a timeline source would result in multiple rounds of calls, each for a different presentation). If the Destination wishes to specify new outputs at any point, it should implement IMFMediaEventGenerator, and it should send the MEDestinationChanged event. This will trigger the Media Engine to call a round of GetOutputInfo calls again.

It is valid for a Destination not to provide any outputs for a given pStreamDescriptor. In this case *ppunkOutputInfo will be NULL, and MF_E_NO_MATCHING_OUTPUTS will be returned.

IMFOutputInfo

The IMFOutputInfo interface is an interface for returning outputs from the Destination. In addition to the methods inherited from IUnknown, the IMFOutputInfo interface exposes the following methods:
GetOutput
GetPropertyStore
GetClock IMFOutputInfo::GetOutput The GetOutput method retrieves a pointer to either a Media Sink or an Activateable.

Syntax

```
HRESULT GetOutput(
    IUnknown **ppunkOutput
);
```

Parameters
  ppunkOutput
    [out] Pointer to a variable that will receive a pointer to an IUnknown that will be either the Media Sink for this output or an IActivate object on which Activate can be called to obtain the Media Sink. Should not be NULL. Upon successful return, *ppunkOutput will be non-NULL.
    IActivate is a Function Discovery interface; it contains an Activate method. The function instance interface IFunctionInstance inherits from it, and sometimes the output will be a Function Instance obtained from Function Discovery.

Return Values

If the method succeeds, it returns S_OK. If it fails, it returns an error code.

Remarks

No special remarks.

See Also

No special cross-references.

IMFOutputInfo::GetPropertyStore

The GetPropertyStore method retrieves a pointer to the Property Store associated with this output, if it exists.

Syntax

```
HRESULT GetPropertyStore(
    IPropertyStore **ppPropertyStore
);
```

Parameters
  ppPropertyStore
    [out] Pointer to a variable that will receive a pointer to the Property Store associated with this output, if it exists. Should not be NULL. Upon successful return, *ppPropertyStore may be NULL if there is no associated Property Store Return Values If the method succeeds, it returns S_OK. If it fails, it returns an error code.

Remarks

See "Destination Changes" section for properties relevant to Destinations that can be set in this Property Store.

See Also

No special cross-references.

IMFOutputInfo::GetPresentationClock

The GetPresentationClock method retrieves a pointer to a Presentation Clock that is meant to control this output independently, if one exists.

Syntax

```
HRESULT GetPresentationClock(
    IMFPresentationClock **ppPresentationClock
);
```

Parameters
  ppPresentationClock
    [out] Pointer to a variable that will receive a pointer to the Presentation Clock associated with this output, if it exists. Should not be NULL. Upon successful return, *ppPresentationClock may be NULL if there is no associated independent Presentation Clock; this will be the case for most scenarios.

Return Values

If the method succeeds, it returns S_OK. If it fails, it returns an error code.

Remarks

This Presentation Clock should exist only if the application wanted to control the clock state of this output independently from the other outputs in the presentation. Most scenarios do not require independent clock control of outputs.

See Also

No special cross-references.

IMFCollection interface

The IMFCollection interface is a generic collection and enumeration interface.

In addition to the methods inherited from IUnknown, the IMFCollection interface exposes the following methods:
AddElement
GetElementCount GetElement RemoveElement IMFCollection::AddElement The AddElement method allows the caller to add an element to the Collection.

Syntax

```
HRESULT AddElement(
    IUnknown*  pUnknown
    );
```

Parameters
  pUnknown
  [in] Pointer to an object supporting IUnknown. If pUnknown is NULL, then a NULL pointer gets added to the collection.

Return Values

If the method succeeds, it returns S_OK. If it fails, it returns an error code.

Remarks

The pointer pUnknown is added to the end of the collection, so it will be enumerated last.

See Also

No special cross-references.

IMFCollection::GetElementCount

The GetElementCount method allows the caller to find out how many elements are in the Collection.

Syntax

```
HRESULT GetElementCount(
    DWORD*  pcElements
    );
```

Parameters
  pcElements
  [out] Pointer to a DWORD in which the number of elements currently in the Collection will be returned.

Return Values

If the method succeeds, it returns S_OK. If it fails, it returns an error code.

Remarks

No special remarks.

See Also

No special cross-references.

IMFCollection::GetElement

The GetElement method allows the caller to retrieve an element by index.

Syntax

```
HRESULT GetElement(
    DWORD      dwIndex,
    IUnknown** ppUnknown
    );
```

Parameters
  dwIndex
  [in] The index of the desired object in the Collection.
  ppUnknown
  [out] Pointer to a variable in which will be returned a pointer to the dwIndex-th element in the Collection. Should not be NULL.

Return Values

If the method succeeds, it returns S_OK. If it fails, it returns an error code.

Remarks

No special remarks.

See Also

No special cross-references.

IMFCollection::RemoveElement

The RemoveElement method allows the caller to remove elements from the Collection.

Syntax

```
HRESULT RemoveElement(
    DWORD      dwIndex,
    IUnknown** ppUnknown
    );
```

Parameters
  dwIndex
  [in] The index of the object to be removed from the Collection.
  ppUnknown
  [out] Pointer to a variable in which will be returned a pointer to the element that has just been removed from the Collection. May be NULL.

Return Values

If the method succeeds, it returns S_OK. If it fails, it returns an error code.

Remarks

Removing an element will cause the index of all subsequent elements in the Collection to be shifted backwards.

See Also

No special cross-references.
  Destination Events
  MEDestinationChanged
  This event is queued by the Destination when it wants IMFDestination::GetOutputInfo to be called for all source streams again.
  Remarks
  Scenarios in which this event would be queued include any application- or Destination-initiated changes in the set of outputs that the Destination will return from GetOutputInfo.

Examples include adding/removing outputs or changing outputs that have already been handed out. The Destination itself may not be aware that GetOutputInfo should be called again; however, if the application possesses that information, it can queue this event from the Destination directly by calling IMFMediaEventGenerator::QueueEvent.

When GetOutputInfo does get called again, the Destination will be expected to provide information about exactly what is changing. Destinations that plan on queueing this event must set certain properties. See the section entitled "Destination properties" for more details, The event will be filled in as follows:

| Event Type  | MEDestinationChanged |
|---|---|
| Status | S_OK |
| Data Object | See remarks below |

Remarks

If the Destination queueing this event supports IMFPresentationDestination, and if this Destination change is associated with a certain pInputPresentation from a former SetOutputPresentation call, the data object returned with this event should be the pInputPresentation pointer. Otherwise, no data should be returned with this event.

See Also

IMFDestination::GetOutputInfo;

Destination Properties

The ppPropertyStore parameter of IMFDestination:: GetOutputInfo provides a way for the Destination to specify additional data that will help in making use of the outputs that were returned.

While Destinations can define their own properties, a few common ones are defined below. All of our PROPERTYKEYs will have the FMTID MFFMTID_Destination.

MFPKEY_DESTINATION_StreamSinkID

Type: VT_UI4

This property must be set for any outputs that for Media Sinks that have multiple Stream Sinks. It disambiguates which Stream Sink to use. Callers should use Stream Sink 0 if this value has not been set.

MFPKEY_DESTINATION_OutputID

Type: VT_UI4

This property must be set by any Destinations that can change their set of outputs in any way. The Destination must ensure that each output has a unique ID (Destination Groups might need to reassign IDs in order to settle ID conflicts and ensure uniqueness.) It allows the caller (i.e. the Media Engine) to understand what changes are being made.

This property is required if MFPKEY_DESTINATION_OutputDisposition is set.

This property is optional but recommended for Destinations whose set of outputs is static.

MFPKEY_DESTINATION_OutputDisposition

Type: VT_UI4

This property is optional but recommended for Destinations whose set of outputs can change. Its value will be one of the following enumerated values:

MFOUTPUT_NEW: This Destination has never handed out this output before (i.e., this is the first time that you'll see its Output ID from this Destination)

MFOUTPUT_UNCHANGED: This output should remain exactly the same as the last time an output with this ID was issued (i.e., if it is an Activateable, calling Activate is unnecessary if you've already done it before)

MFOUTPUT_CHANGED: Some change needs to occur. Either the output corresponds to a different object, or it's the same object but a Media Type change needs to happen This property provides a hint to the Media Engine about how much topology rebuilding needs to be done. If it is absent, MFOUTPUT_NEW will be assumed.

MFPKEY_DESTINATION_MediaType

Type: VT_IUNKNOWN

This property is optional and should be set if MFPKEY_DESTINATION_OutputDisposition property is set to the value MFOUTPUT_CHANGED, and if the change involves a Media Type change to the current Media Sink. The Media Type change will be applied at the appropriate time by the Media Engine.

MFPKEY_DESTINATION_NoShutdownOnRemove

Type: VT_BOOL

This property is optional; if missing, it is assumed to be VARIANT_FALSE. If this property is present and set to VARIANT_TRUE, then the Media Engine will not shut down the Media Sink obtained from this output if this output is ever not returned in a round of GetOutputInfo calls in the future.

Example: Suppose an encoding session has three source presentation segments: A, B, and C. Suppose that the application wishes to have the archive Destination present for source segments A and C, but not for segment B. The application will provide a Destination (probably configured via IMFPresentationDestination) that returns a set of outputs including some archive outputs when GetOutputInfo is called for streams from segment A and C, but the set of outputs returned when GetOutputInfo is called for streams from segment B will not inclue the archive outputs. However, the application does not wish for the archive Media Sink to be shut down during segment B, since it needs to stay alive for when segment C happens. This problem will be solved by setting MFPKEY_DESTINATION_NoShutdownOnRemove on the archive outputs when they are returned from GetOutputInfo. (The archive Media Sink will still, of course, be shutdown on IMFMediaEngine::Shutdown like everything else.)

MFPKEY_DESTINATION_RatelessSink

Type: VT_BOOL

If this property is present and set to VARIANT_TRUE, then the Media Sink associated with this output is treated by the Media Engine as though it set the MF_RATELESS_SINK characteristic from IMFMediaSink::GetCharacteristics. If this property is absent or set to VARIANT_FALSE, then the Media Engine just uses the characteristics returned from IMFMediaSink::GetCharacteristics.

Media Sink ratelessness is discussed in greater detail in the Media Sink Specification and the MF Timing Model Specification. If all Media Sinks in a presentation are rateless, then the Media Engine does not attempt to impose any timing on the media pipeline, and the pipeline just runs as fast as it can.

Example: In an encoding scenario where there is a video renderer present for preview or postview, the Destination returning the video renderer as an output should set this property to VARIANT_TRUE. That is because although video renderers are not inherently rateless Media Sinks, we want video renderers to behave ratelessly in this scenario, simply displaying frames when they arrive.

IMFPresentationDestination Interface

The IMFPresentationDestination interface is optionally supported by Destinations. For those Destinations that are able to create their Media Sinks up-front, it provides a standard way of seeing the Media Types and being able to manage the output Media Types.

In addition to the methods inherited from IMFDestinaton, the IMFPresentationDestination interface exposes the following methods:
GetOutputPresentation
SetOutputPresentation
IMFPresentationDestination::GetOutputPresentation The GetOutputPresentation method allows the caller to view a Presentation Descriptor that represents the outputs that will be returned from GetOutputInfo. This is convenient, for instance, for apps that wish to know what Media Types will be used in the output Syntax

```
HRESULT GetOutputPresentation(
    IMFPresentationDescriptor* pInputPresentationDescriptor,
    IMFPresentationDescriptor** ppOutputPresentationDescriptor);
```

Parameters
pInputPresentationDescriptor
[in] A NULL value indicates that the caller wants the default output Presentaiton Descriptor in *ppOutputPresentationDescriptor. Otherwise, this is a pointer to a PresentationDescriptor that has been sent to the application via the MENewPresentation event. It is not valid to use a copy of that Presentation Descriptor. The Destination will return the Presentation Descriptor that was associated with pInputPresentationDescriptor via SetOutputPresentation. If no such association was made, MF_E_DESTINATION_UNRECOGNIZED_ PRESENTATION will be returned.

Must be NULL if SetOutputPresentation is not supported.
ppOutputPresentationDescriptor
[out] Pointer that will receive a pointer to a Presentation Descriptor describing either the default output presentation (if pInputPresentationDescriptor is NULL) or the output presentation associated with pInputPresentationDescriptor. Should not be NULL.

Return Values
If the method succeeds, it returns S_OK. If it fails, it returns an error code.

Remarks
Destinations must generate their own default Presentation Descriptor (although some may allow the user to change it via SetOutputPresentation). Therefore, GetOutputPresentation (NULL, &pOutputPresentation) can be called without ever having called SetOutputPresentation. Therefore, this call must succeed when pInputPresentationDescriptor is NULL.

Destinations may not know the exact mediatype of their outputs; therefore, Destinations should supply a *ppOutputPresentation whose media types contain as much information as possible, even though this might be very vague information (perhaps only the major types will be valid in the media types).

See Also
MENewPresentation
IMFPresentationDestination::SetOutputPresentation

The SetOutputPresentation method allows the caller to indicate the desired output presentation to be handed out by the Destination. The output presentation can either be associated with a particular input presentation, or can be specified as a default presentation.

Syntax

```
HRESULT SetOutputPresentation(
    IMFPresentationDescriptor* pInputPresentationDescriptor,
    IMFPresentationDescriptor* pOuputPresentationDescriptor);
```

Parameters
pInputPresentationDescriptor
[in] A NULL value indicates that the caller wants to set the default output Presentation Descriptor. Otherwise, this is a pointer to a PresentationDescriptor that has been sent to the application via the MENewPresentation event. It is not valid to use a copy of that Presentation Descriptor.

In GetOutputInfo, the Destination will look for the pStreamDescriptor in all of the input presentations it has received via SetOutputPresentation and return an output corresponding to a stream in the associated output presentation if a match is found. If a match is not found, an output corresponding to a stream in the default output presentation should be returned. (Implementations will compare IUnknown * pointer values to determine whether there is a match)
pOutputPresentationDescriptor
[in] Pointer to a Presentation Descriptor to be associated with pInputPresentationDescriptor for the purposes of GetOutputInfo calls. A NULL value indicates that for pInputPresentationDescriptor streams, the default output presentation should be used. Since a NULL value will not cause there to be any changes, even Destinations that have fixed outputs can succeed in this case.

Return Values
If the method succeeds, it returns S_OK. If it fails, it returns an error code. MF_E_DESTINATION_FIXED will be returned by Destinations that do not support this functionality.

Remarks
Support of this function is optional; Destinations that have a fixed output presentation can return MF_E_DESTINATION_FIXED. (Some fixed-MediaType Destinations might want to accept this call for output presentations that match the current default output presentation if the caller simply wants to add stream-matching metadata.)

It is not valid to call SetOutputPresentation with a pOutputPresentationDescriptor that has Media Types that are unsupported by the Media Sink. Destinations should attempt to validate this whenever possible.

SetOutputPresentation should not be called while the Destination is locked. If the Destination is locked, implementations should either block until the Destination is unlocked or return MF_E_DESTINATION_LOCKED.

The Destination will not automatically fire MEDestinationChanged when SetOutputPresentation is called. This is because Destinations implementing IMFPresentationDestination are not required to implement IMFMediaEventGenerator. Presentation Destinations that do wish for a change to take effect immediately should implement IMFMediaEventGenerator, and it should be up to the application to queue the MEDestinationChanged event manually after making the change.

The pInputPresentation pointer should be the same one that came with the MENewPresentation event from the Media Engine. This is because for all calls to GetOutputInfo for this presentation, the pStreamDescriptor will be the same IUnknown * as those in the MENewPresentation Presentation Descriptor; the Destination relies on this fact in order to match streams according to this SetOutputPresentation call.

In order to ensure that the application has finished making calls to SetOutputPresentation by the time GetOutputInfo gets called, the application should be a delegate for the MENewPresentation event, which will keep the Media Engine from calling GetOutputInfo until the app has signaled that it is done handling the MENewPresentation event.

See Also

MENewPresentation

IMFPresentationDestination Properties

Applications may specify the following properties in the metadata of the output presentation descriptor passed to SetOutputPresentation.

MFPKEY_DESTINATION_ASSOCIATE_TO_ INPUT_STREAM_INDEX

The application sets this property on the metadata of the stream descriptors of the output presentation descriptor pOutputPresentation passed to SetOutputPresentation when pInputPresentation is non-NULL. This property should be of type VT_UI4. Its value should be the index (not the identifier) of the stream in pInputPresentation to which the stream should be matched.

When the Destination subsequently receives a call to GetOutputInfo where pStreamDescriptor is equal to the IMFStreamDescriptor pointer in pInputPresentation, an output corresponding to the stream on which this property was set will be returned.

Example Computing Environment

Figure 8:
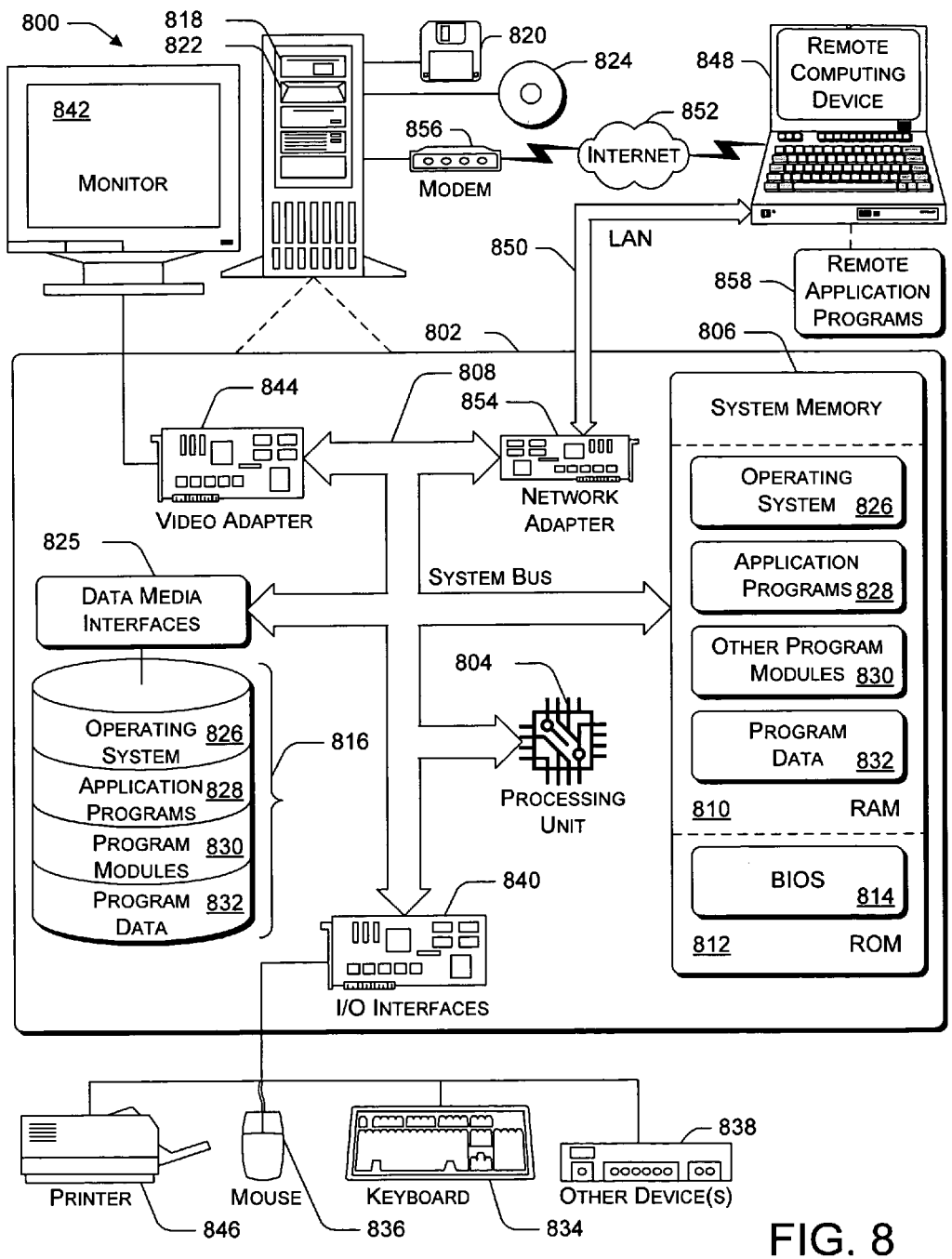
FIG. 8 is a diagram that illustrates the general computer environment for the system.

FIG. 8 illustrates a general computer environment 800, which can be used to implement the techniques described herein. The computer environment 800 is only one example of a computing environment and is not intended to suggest any limitation as to the scope of use or functionality of the computer and network architectures. Neither should the computer environment 800 be interpreted as having any dependency or requirement relating to any one or combination of components illustrated in the example computer environment 800.

Computer environment 800 includes a general-purpose computing device in the form of a computer 802. The components of computer 802 can include, but are not limited to, one or more processors or processing units 804, system memory 806, and system bus 808 that couples various system components including processor 804 to system memory 806.

System bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., Fire Wire, bus.

Computer 802 may include a variety of computer readable media. Such media can be any available media that is accessible by computer 802 and includes both volatile and non-volatile media, removable and non-removable media.

System memory 806 includes computer readable media in the form of volatile memory, such as random access memory (RAM) 810; and/or non-volatile memory, such as read only memory (ROM) 812 or flash RAM. Basic input/output system (BIOS) 814, containing the basic routines that help to transfer information between elements within computer 802, such as during start-up, is stored in ROM 812 or flash RAM. RAM 810 typically contains data and/or program modules that are immediately accessible to and/or presently operated on by processing unit 804.

Computer 802 may also include other removable/non-removable, volatile/non-volatile computer storage media. By way of example, FIG. 8 illustrates hard disk drive 816 for reading from and writing to a non-removable, non-volatile magnetic media (not shown), magnetic disk drive 818 for reading from and writing to removable, non-volatile magnetic disk 820 (e.g., a "floppy disk"), and optical disk drive 822 for reading from and/or writing to a removable, non-volatile optical disk 824 such as a CD-ROM, DVD-ROM, or other optical media. Hard disk drive 816, magnetic disk drive 818, and optical disk drive 822 are each connected to system bus 808 by one or more data media interfaces 825. Alternatively, hard disk drive 816, magnetic disk drive 818, and optical disk drive 822 can be connected to the system bus 808 by one or more interfaces (not shown).

The disk drives and their associated computer-readable media provide non-volatile storage of computer readable instructions, data structures, program modules, and other data for computer 802. Although the example illustrates a hard disk 816, removable magnetic disk 820, and removable optical disk 824, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 816, magnetic disk 820, optical disk 824, ROM 812, and/or RAM 810, including by way of example, operating system 826, one or more application programs 828, other program modules 830, and program data 832. Each of such operating system 826, one or more application programs 828, other program modules 830, and program data 832 (or some combination thereof) may enact transactions, in accordance with the example embodiments described above, to implement all or part of the resident components that support the distributed file system.

A user can enter commands and information into computer 802 via input devices such as keyboard 834 and a pointing device 836 (e.g., a "mouse"). Other input devices 838 (not shown specifically) may include a microphone, joystick, game pad, satellite dish, serial port, scanner, and/or the like. These and other input devices are connected to processing unit 804 via input/output interfaces 840 that are coupled to system bus 808, but may be connected by other interface and bus structures, such as a parallel port, game port, or a universal serial bus (USB).

Monitor 842 or other type of display device can also be connected to the system bus 808 via an interface, such as video adapter 844. In addition to monitor 842, other output peripheral devices can include components such as speakers (not shown) and printer 846 which can be connected to computer 802 via I/O interfaces 840.

Computer 802 can operate in a networked environment using logical connections to one or more remote computers, such as remote computing device 848. By way of example, remote computing device 848 can be a PC, portable computer, a server, a router, a network computer, a peer device or other common network node, and the like. Remote computing device 848 is illustrated as a portable computer that can include many or all of the elements and features described herein relative to computer 802. Alternatively, computer 802 can operate in a non-networked environment as well.

Logical connections between computer 802 and remote computer 848 are depicted as a local area network (LAN) 850 and a general wide area network (WAN) 852. Such networking environments are commonplace in offices, enterprise-wide computer networks, intranets, and the Internet.

When implemented in a LAN networking environment, computer 802 is connected to local network 850 via network interface or adapter 854. When implemented in a WAN networking environment, computer 802 typically includes modem 856 or other means for establishing communications over wide network 852. Modem 856, which can be internal or external to computer 802, can be connected to system bus 808 via I/O interfaces 840 or other appropriate mechanisms. The illustrated network connections are examples and other means of establishing at least one communication link between computers 802 and 848 can be employed.

In a networked environment, such as that illustrated with computing environment 800, program modules depicted relative to computer 802, or portions thereof, may be stored in a remote memory storage device. By way of example, remote application programs 858 reside on a memory device of remote computer 848. For purposes of illustration, applications or programs and other executable program components such as the operating system are illustrated herein as discrete blocks, although it is recognized that such programs and components reside at various times in different storage components of computing device 802, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A system, comprising:
   a processor; and
   one or more computer-readable media, the one or more computer-readable media including:
   a presentation that includes media content, the media content comprising at least one of audio content and video content;
   a media engine to obtain input information from the media content, the media engine including at least one transform and at least one media sink, and the input information including a media content descriptor information and media type information;
   a destination object to receive the input information from the media engine, to further selectively associate the input information with one or more output presentation descriptors, to provide the one or more output presentation descriptors to the media engine, and to expose an application program interface (API) by implementing a method that is defined to have:
   an input argument that is a pointer to a descriptor of a stream of media content to be presented in the presentation,
   another input argument that is a pointer to a media type to be used in presenting the stream of media content, and
   an output argument that is a pointer to an object containing information regarding where and how media content is to be presented; and
   an application to provide the presentation to an output target, the application further configured to dynamically create the media engine and the destination object,
   wherein the media engine is further configured to setup the at least one transform and obtain the at least one media sink based on the one or more output presentation descriptors provided by the destination object to process the presentation for output to the output target.

2. The system of claim 1, wherein the API is used by the application to interact directly with the destination object.

3. The system of claim 1, wherein the output argument is an information object.

4. The system of claim 3, wherein the destination object resides in a computing device and the media sink component resides in another computing device.

5. The system of claim 4, wherein the destination object is to further signal the media engine that a connection or change therein has occurred between the computing devices.

6. The system of claim 1, wherein the destination object is to further receive information associating an input media stream with a presentation output media stream.

7. The system of claim 6, wherein the destination object is to further receive information associating an input media stream with a presentation output media stream without involvement of the application.

8. The system of claim 1, wherein the output argument includes a plurality of sub-destination objects, each sub-destination object being related to an output media stream to be presented in the presentation.

9. The system of claim 8, wherein the API is selectively used by the application to change how many sub-components are contained in the component.

10. The system of claim 1, wherein the output presentation descriptors in the destination object can be changed while the presentation is being presented.

11. The system of claim 10, wherein the destination object is to further signal the media engine that output presentation descriptors in the destination object is being changed.

12. The system of claim 11, wherein the destination object is to further selectively signal the media engine in response to an operation by the application.

13. The system of claim 1, wherein the destination object is to further selectively provide information to the media engine related to a presentation clock that allows the application to control the presentation independently of other media content being presented in the presentation.

14. The system of claim 1, wherein the destination object is to further selectively provide outputs presentation descriptors for subsequent presentations originating from the media source in a "timeline"-style presentation.

15. The system of claim 1, wherein the destination object is to selectively provide a series of output presentation descriptors to the media engine for a series of presentations that occur during a session.

16. The system of claim 15, wherein the destination object selectively provides the output presentation descriptors multiple times as part of the series of output presentation descriptors.

17. A method for use by an application in presenting a presentation, the method comprising:
dynamically creating a media engine and a destination object using an application that provides media content to an output target;
selectively providing input information describing media content to be presented in the presentation to the a destination object in response to an operation by the a media engine;
selectively associating the input information with output information using the destination object, the output information enabling the transformation of the presentation for output to an output target; and
providing the output information from the destination object to the media engine,
wherein the media engine provides the presentation to the output target without requiring further interaction with the application by selectively setting up one or more transforms and obtaining one or more media sinks based on the output information following dynamic creation of the media engine by the application, and
wherein further the selectively providing and the providing comprise using an application program interface (API) implementing a method that is defined to have:
an input argument that is a pointer to a descriptor of a stream of media content to be presented in the presentation;
another input argument that is a pointer to a media type to be used in presenting the stream of media content; and
an output argument that is a pointer to the destination object.

18. The method of claim 17, wherein the API is used by the application to interact indirectly with the media sinks of the media engine.

19. The method of claim 17, wherein the destination object contains output information used by the media engine to determine where the presentation is to be presented.

20. The method of claim 17, wherein the output information includes an output information object.

21. The method of claim 17, wherein the selectively associating the input information with output information includes associating an input media stream with a presentation output media stream to be presented in the presentation.

22. The method of claim 17, wherein the selectively associating the input information with output information includes obtaining output information related to a plurality of output media streams for which a given input media stream is intended in response to a request from the media engine.

23. The method of claim 22, further comprising changing the number of output media streams are present in the plurality of output media streams in response to an operation by the application.

24. The method of claim 17, further comprising changing at least a portion of the selectively provided output information while the presentation is being presented.

25. The method of claim 24, further comprising signaling the media engine that the at least a portion of the output information is being changed while the presentation is being presented.

26. The method of claim 25, selectively signaling the media engine in response to an operation by the application.

27. The method of claim 17, wherein the presentation is presented in a client device and the application resides in a server device.

28. The method of claim 17, wherein the selectively providing output information to the media engine includes providing presentation clock that enables the application to control the presentation independently of other media content being presented in the presentation.

* * * * *